(12) United States Patent
Lindsay et al.

(10) Patent No.: US 9,648,669 B2
(45) Date of Patent: May 9, 2017

(54) LIDDED CONTAINERS AND COMPONENTS

(75) Inventors: Brendan Jon Lindsay, Auckland (NZ); James Richard Manley, Auckland (NZ)

(73) Assignee: SISTEMA PLASTICS LIMITED (NZ)

( * ) Notice: Subject to any disclaimer, the term of this patent is extended or adjusted under 35 U.S.C. 154(b) by 185 days.

(21) Appl. No.: 14/001,113

(22) PCT Filed: Feb. 22, 2012

(86) PCT No.: PCT/IB2012/050795
§ 371 (c)(1),
(2), (4) Date: Oct. 8, 2013

(87) PCT Pub. No.: WO2012/114277
PCT Pub. Date: Aug. 30, 2012

(65) Prior Publication Data
US 2014/0042167 A1  Feb. 13, 2014

(30) Foreign Application Priority Data

Feb. 22, 2011  (NZ) .......................... 591286

(51) Int. Cl.
*B65D 51/16*  (2006.01)
*H05B 6/64*  (2006.01)
(Continued)

(52) U.S. Cl.
CPC .......... *H05B 6/6408* (2013.01); *A47J 36/027* (2013.01); *A47J 36/10* (2013.01)

(58) Field of Classification Search
CPC .. A47J 36/00; A47J 36/06; A47J 36/02; A47J 36/10; A47J 36/022; A47J 36/027; H05B 6/64; H05B 6/6408
(Continued)

(56) References Cited

U.S. PATENT DOCUMENTS 4,976,370 A    12/1990  Cassel
5,225,165 A *  7/1993  Perlman .......................... 422/548
(Continued)

FOREIGN PATENT DOCUMENTS

EP    2103543 A1    9/2009
NZ    405603        4/2005
(Continued)

OTHER PUBLICATIONS

International Search Report and Written Opinion of the International Searching Authority for International Application No. PCT/IB2012/050795, dated Apr. 18, 2012.

*Primary Examiner* — Steven A. Reynolds
*Assistant Examiner* — Javier A Pagan
(74) *Attorney, Agent, or Firm* — McCarter & English, LLP

(57) ABSTRACT

A microwavable lidded container assembly comprising a container base having peripheral walls and an open top, a lid able to seat and thereby close the container base at the open top to define an enclosure; characterised in that the lid has a closable vent and the lid has a body adapted to carry a near peripheral seal to be interposed between a downward facing shoulder or plateau of the lid onto the top of a peripheral wall of the base container yet to have outstands at opposed perimeter regions of the lid to act as handle pairs for lifting the lid relative to the container base to deseat the lid therefrom.

20 Claims, 14 Drawing Sheets

(51) Int. Cl.
*A47J 36/10* (2006.01)
*A47J 36/02* (2006.01)

(58) Field of Classification Search
USPC ............ 220/361, 315, 323, 324, 367.1, 373
See application file for complete search history.

(56) References Cited

U.S. PATENT DOCUMENTS

| | | | |
|---|---|---|---|
| 5,363,978 | A | 11/1994 | Molo |
| 5,382,408 | A * | 1/1995 | Perlman ................ B01L 3/5021 |
| | | | 206/815 |
| 6,170,696 | B1 | 1/2001 | Tucker et al. |
| D613,111 | S | 4/2010 | Furlong |
| 7,866,502 | B2 | 1/2011 | Maxwell |
| 2008/0110911 | A1* | 5/2008 | Chen ............................ 220/788 |
| 2008/0203096 | A1 | 8/2008 | Maxwell |
| 2009/0321462 | A1* | 12/2009 | Hui ...................... B65D 43/021 |
| | | | 220/780 |

FOREIGN PATENT DOCUMENTS

| | | |
|---|---|---|
| NZ | 537287 | 2/2006 |
| WO | WO 2006/077010 A1 | 7/2006 |
| WO | WO 2010/121295 A1 | 10/2010 |

\* cited by examiner

LIDDED CONTAINERS AND COMPONENTS

FIELD OF THE INVENTION

The present invention relates to lidded containers, components and/or assemblies thereof. In particular but not solely the present invention relates to microwavable containers of moulded plastics components.

BACKGROUND

Microwavable containers such as of a kind shown in U.S. Pat. No. D. 613,111 are commonly made from a thin walled plastic that is flexible but sufficiently strong to remain integral to retain content after and/or before being subjected to microwave cooking. When heated the container material may become more flexible. This flexibility allows a peeling like removal of the lid from the container base.

The prior art lid of U.S. Pat. No. D. 613,111 has a lift tab that can be engaged by a finger or between fingers. Separation of the lid from the container base is initiated at the lift tab to gradually deseat the lid from the container base. This gradual deseating allows for a venting of fluid from the enclosure of the container but such venting occurs in a very localised manner. For example steam can jettison through the gap created, adjacent the lift tab. The steam can flow rapidly and with substantial volume and travel some distance from the container before becoming dispersed to an extent that it loses a significant amount of heat. As a result such localised steam venting, occurring at or near where a person's finger is located, can harm or cause discomfort to the person.

In addition, because such lids are flimsy, the lids may break after prolonged use or from impact. Known containers like this are also often used to cook noodles or other food and may be carried in a person's bag and can hence be subjected to adverse conditions that may impact damage the container. Some such lids and/or container bases are designed for use only once. Such light weight constructed lids may also not lend themselves to top loading such as may occur where a plurality of like container are stacked on top of each other.

It is therefore an object of the present invention to provide a lidded container that addresses at least one of the above-mentioned disadvantages and/or to at least provide the public with a useful choice.

BRIEF DESCRIPTION OF THE INVENTION

In a first aspect the present invention may be broadly said to be a microwavable lidded container assembly comprising
a container base having peripheral walls and an open top,
a lid able to seat and thereby close the container base at the open top to define an enclosure;
characterised in that the lid has a closable vent and the lid has a body adapted to carry a near peripheral seal to be interposed between a downward facing shoulder or plateau of the lid onto the top of a peripheral wall of the base container yet to have outstands at opposed perimeter regions of the lid to act as handle pairs for lifting the lid relative to the container base to deseat the lid therefrom.

Preferably the vent is a toggle or rocker closable vent.

Preferably said outstands are corner or corner-like flares of the body.

Preferably the seal and the container base seat with each other at a notional closure plane and the lid body is adapted and configured to allow the deseating to occur without substantial out of plane deformation of the peripheral seal.

Preferably the lid body and the container base are adapted and configured to allow, during the deseating of the seal, a complete peripheral gap to be created between said lid and container base substantially simultaneously in order to rapidly equalise pressure within the lidded container with ambient conditions.

Preferably the lid body and the container base are adapted and configured to allow, during the deseating of the seal, a complete peripheral gap to be created between said lid and container base in order to equalise pressure within the lidded container with ambient conditions in a manner evenly distributed at the complete peripheral gap.

Preferably the lid is sufficiently rigid to allow a non deformed and/or non prying removal (and preferably substantially complete and simultaneous deseating) of the lid from the container base.

Preferably a lip of the lid extends about the seal and projects a distance below the seal to prevent any flow of fluid from the enclosure of the lidded container during deseating being directed purely outwardly (eg in a direction parallel to the notional plane) of the lid.

Preferably a lip of the lid extends about the seal and projects a distance below the seal to any flow of fluid from the enclosure of the lidded container during deseating being directed downwardly and away from said outstands.

Preferably the outstands are handles integrally moulded with said body.

Preferably the outstands are handles integrally moulded with said body and are formed as a continuation of a rim of the body, the rim preferably being the other most peripheral portion of the body.

Preferably each outstand defines a downwardly facing lifting surface that is preferably non planar.

Preferably at least part of said lifting surface is located above at least one of the seal and a lower rim of any lip of the body located about the seal.

In a further aspect the present invention may be broadly said to be a lid assembly having or being a moulded plastics lid member carrying an underlying elastomeric seal able to be held by a seal matching downwardly facing shoulder, plateau or other continuous profile (preferably planar) to a complementary underlying walled open topped container (as the base); wherein there are a plurality of moulded outwardly and upward flare regions of the moulded plastics lid able, in pairs, to be used for uplifting the lid and seal from the complementary container.

Preferably the lid assembly is shaped and configured to seat with the container in a manner to prevent the need to pry the lid off to deseat the lid from the container.

In a further aspect the present invention may be broadly said to be a lid moulding, or a lid assembly incorporating a lid moulding, having a peripheral downwardly directed shoulder, plateau or the like inwardly or an outwardly directed periphery (whether flange like, planar or other) wherein corners or like transitions have an outward and upward flare to be used to uplift the lid moulding (or any lid assembly incorporating the lid moulding).

In a further aspect the present invention may be broadly said to be, in combination, and lidded container assembly comprising;
a moulded container base of a substantially quadrilateral footprint and a peripheral wall of wall regions (preferably outward bulging) and/or convexly curved transitions between wall regions, the peripheral wall having an ability to be sealed by a peripheral seal member to be carried by a lid assembly, and a lid assembly of at least one moulded body member and underlying seal able to over lie the peripheral wall of the base and to affect a seal therewith reliant on the interposed seal; wherein the lid has one or more of the following features:

the lid has a continuous surface at least substantially in the same plane to press down on the seal yet the lid has outstands upwardly and outwardly of that surface, the lid has a toggle open/close vent feature, the lid carries plural latches each hinged from the lid and each able to be latched under a profile feature of the base.

Preferably the toggle open/close vent feature is a toggle or rocker closable vent.

Preferably said outstands are corner or corner-like flares of the body member.

Preferably the seal and the container base seat with each other at a notional closure plane and the lid body is adapted and configured to allow the deseating to occur without substantial out of plane deformation of the peripheral seal.

Preferably the lid body and the container base are adapted and configured to allow, during the deseating of the seal, a complete peripheral gap to be created between said lid and container base substantially simultaneously in order to rapidly equalise pressure within the lidded container with ambient conditions.

Preferably the lid body and the container base are adapted and configured to allow, during the deseating of the seal, a complete peripheral gap to be created between said lid and container base in order to equalise pressure within the lidded container with ambient conditions in a manner evenly distributed at the complete peripheral gap.

Preferably the lid is sufficiently rigid to allow a non deformed and/or non prying removal (and preferably substantially complete and simultaneous deseating) of the lid from the container base.

Preferably a lip of the lid extends about the seal and projects a distance below the seal to prevent any flow of fluid from the enclosure of the lidded container during deseating being directed purely outwardly (eg in a direction parallel to the notional plane) of the lid.

Preferably a lip of the lid extends about the seal and projects a distance below the seal to any flow of fluid from the enclosure of the lidded container during deseating being directed downwardly and away from said outstands.

Preferably the outstands are handles integrally moulded with said body.

Preferably the outstands are handles integrally moulded with said body and are formed as a continuation of a rim of the body, the rim preferably being the other most peripheral portion of the body.

Preferably each outstand defines a downwardly facing lifting surface that is preferably non planar.

Preferably at least part of said lifting surface is located above at least one of the seal and a lower rim of any lip of the body located about the seal.

In a further aspect the present invention may be broadly said to be a quadrilateral in plan shape lidded container comprising or including a container base having peripheral walls and an open top, a lid able, via interposed peripheral seal (whether carried by the lid or not), to seat and thereby close the container at the open top;

wherein the lid and the base are latchable one to the other by latch components carried by one or the other, or both;

and wherein the lid has, when view in plan and at least at opposed corners, a corner-like transition such transition are outwardly yet upwardly directed and/or positioned with respect to the interposed seal, each transition to provide a surface set outwardly from the seal that can be engaged by a finger of a person to allow the lifting of the lid relative the container base for substantially complete and simultaneous deseating of the lid with the container base.

Preferably the corner-like transitions are curved or otherswise (e.g. for example a substantially quadrilateral plan silhouette, albeit optionally outwardly bulging or curved, and albeit with optional convex curving of the transitions).

Preferably the seal is carried by the lid and is acted upon by a planar matching surface of the lid . . . .

In a further aspect the present invention may be broadly said to be a lid, or lid body of a lid assembly, having a peripheral profile adapted to seal directly, or indirectly via an interposed seal, onto an underlying compatible container;

wherein at each opposed side of the lid when viewed in plan view, the lid or lid body has been moulded with a flare above the peripheral profile that is adapted to allow finger engagement therewith to allow the finger to be positioned above the zone of the peripheral profile during and to assist uplifting of the lid or lid body.

In a further aspect the present invention may be broadly said to be, in combination or in assembly, a microwavable container having an opening, and a microwavable lid assembly able to close the opening;

wherein latching between the container and the lid assembly can hold an opening surrounding sealing interrelationship;

and wherein venting using a venting functionality of the lid assembly need not disturb the hold sealing interrelationship;

and wherein the lid assembly has at least two outstands above the level of such sealing interrelationship, but not necessarily beyond, or substantially beyond, the periphery of such sealing interrelationship when viewed in plan, which allow an uplifting of the lid assembly from such sealing interrelationship once the latching is released.

As used herein "flare" "and/or" "flares" or the equivalent preferably but not necessarily refers to a raised variation in an outward peripheral flange of the lid body.

As used herein the term "(s)" following a noun means one or both of the singular or plural forms.

As used herein the term "and/or" means "and" or "or". In some circumstances it can mean both.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

A preferred form of the present invention will now be described with reference to the accompany drawings in which.

DETAILED DESCRIPTION OF THE INVENTION

Figure 1:
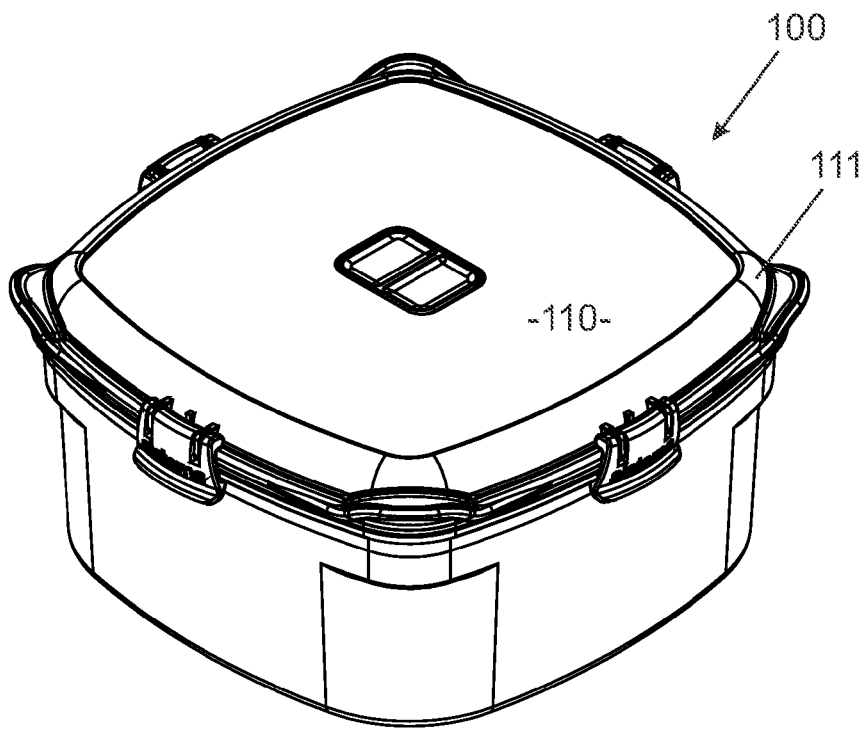
FIG. 1 is a perspective view from above of a closed lidded container that may contain at least a steam basket and showing the toggle or rocker vent in a closed condition.

The present invention relates to lidded container 100 such as shown in one embodiment in FIG. 1 and/or components thereof or for. The components are preferably of a suitable plastics materials to define a base ("container base") 21 and a lid 22 having one or more of the following features or characteristics an ability to be latched to the other, an ability to be vented (e.g. using for example an operable vent)

an ability to interpose a seal carried by the lid between the lid and the container base, a generally quadrilateral footprint albeit with outwardly curved regions between corner regions or corner-like regions, corner or corner-like regions of the lid have outward and upward extending and/or flared regions of the lid moulding, and an ability to contain any one or more of a moulded rack, a supported moulded basket, and/or a supported tray.

In a preferred form of the present invention the moulded components, save for the preferred elastomeric seal, are preferably made of a suitable blended polypropylene so as to accommodate the microwave temperatures involved. Other plastics materials can be chosen. The lidded container may be used to heat food such a noodles or other food ingredients, including liquid. As a result a significant amount of steam may be generated in the enclosure of the lidded container.

The lidded container material may also be of a kind that is tough and able to be formed so as to create significant inherent rigidity in the components, in particular but not solely of the lid component.

As can be seen each of the assemblies of 1 and 2 have a similar style lid 22. The lid 22 is an assembly of a main lid member 6 and a toggle or rocker 16 to control a vent opening 14 of the main lid member 6.

The lid member comprises of a main closure panel 110 and a peripheral rim 111 thereabout. The main closure panel is substantially planar and/or does not have significant protruding members or regions. The lid can receive and support a like container base on top. The transition of the main closure panel 110 and the rim 111 may define a lip or other to allow the base of a container base of a like lidded container to register therewith or be registered thereby to the lid.

The lid 22 is preferably adapted to set down onto a substantially rectangular foot printed container base 21 but preferably with bulging wall regions between rounded corner like regions.

Figure 7:
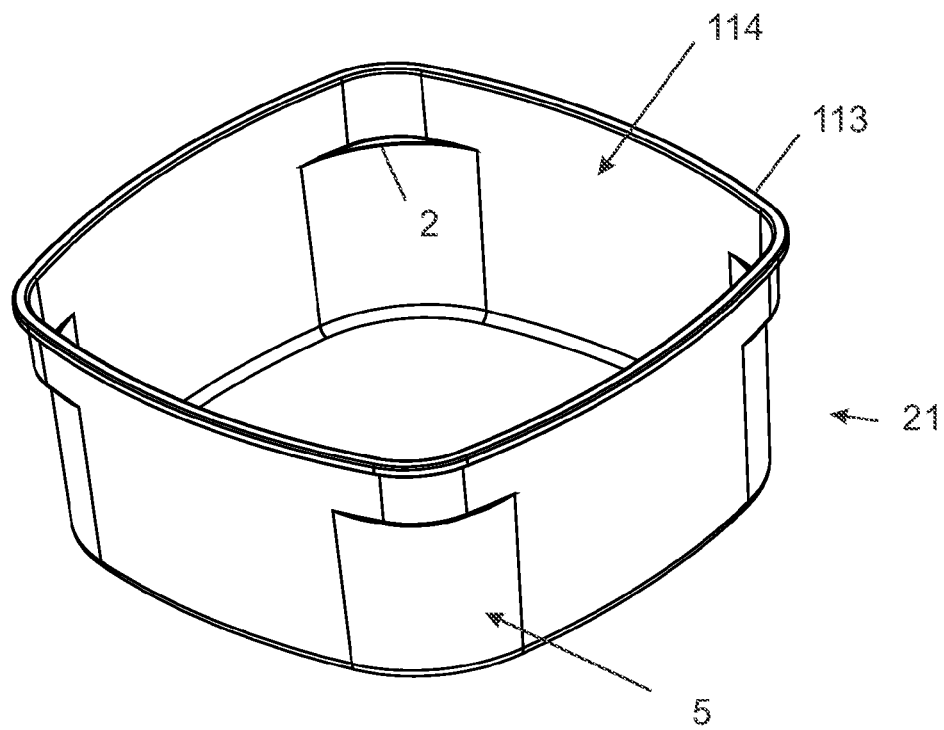
FIG. 7 shows a perspective view from above of a base of an assembly as in FIGS. 1, 3 and 4 showing the four corner region intrusions to act as support ledges of the steam basket.
Figure 8:
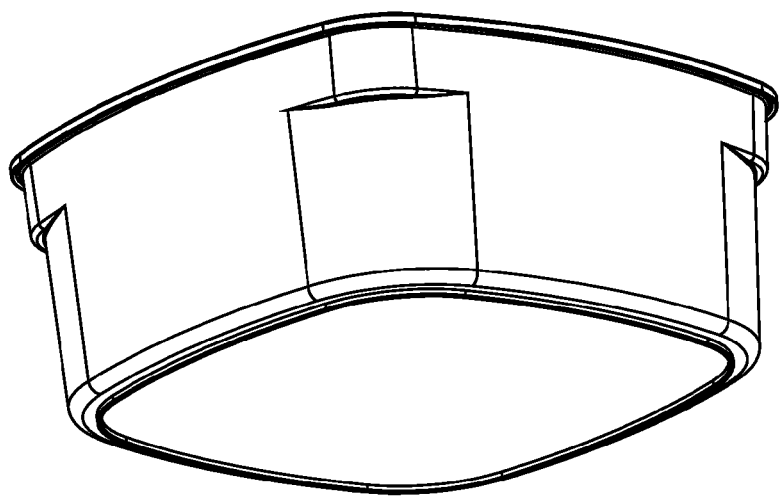
FIG. 8 is a perspective view from below of the base of FIG. 7.
Figure 9:
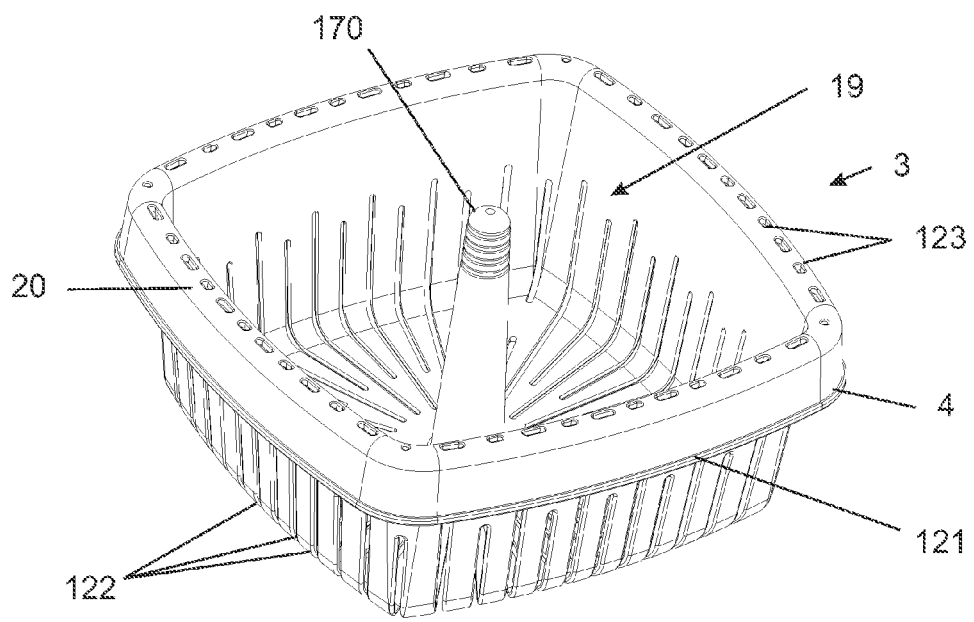
FIG. 9 is a perspective view from above of a preferred moulded steamer basket having a central upstand able to be used as a handle yet having a well defined thereabout by its base and upstanding peripheral walls, there being perforations extending from that well base up into the peripheral walls and there, in addition, being a transition over from the top of the peripheral walls down to support flanges able, in each corner, to rest on a ledge of a base as shown in FIGS. 7 and 8, the transitions also being perforate to allow steam flow-through, FIG. 10 is a perspective of the steamer basket from below.
Figure 10:
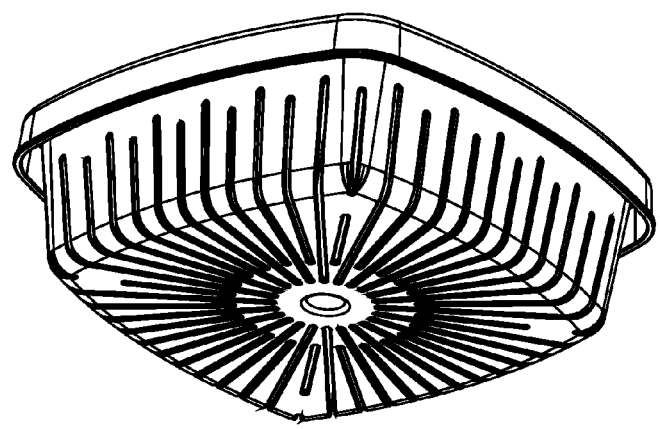

A preferred container base 21 for the deeper and steamer basket including assembly of FIG. 1 is that moulding shown as 1 in FIG. 7. This container base is preferably profiled to define, at each corner region, a ledge 2 which is to act as a support for a corner region of the steamer basket 3 (i.e., to support each corner region 4 thereof).

The ledges 2 are preferably provided by a matching exterior shaped region 5 that assists tooling (ie. so that a two part injection moulding tool can be used for the base).

Similarly, preferably a two part moulding tool can be used for the moulded main lid member 6 that is to be the body of the lid.

Figure 11:
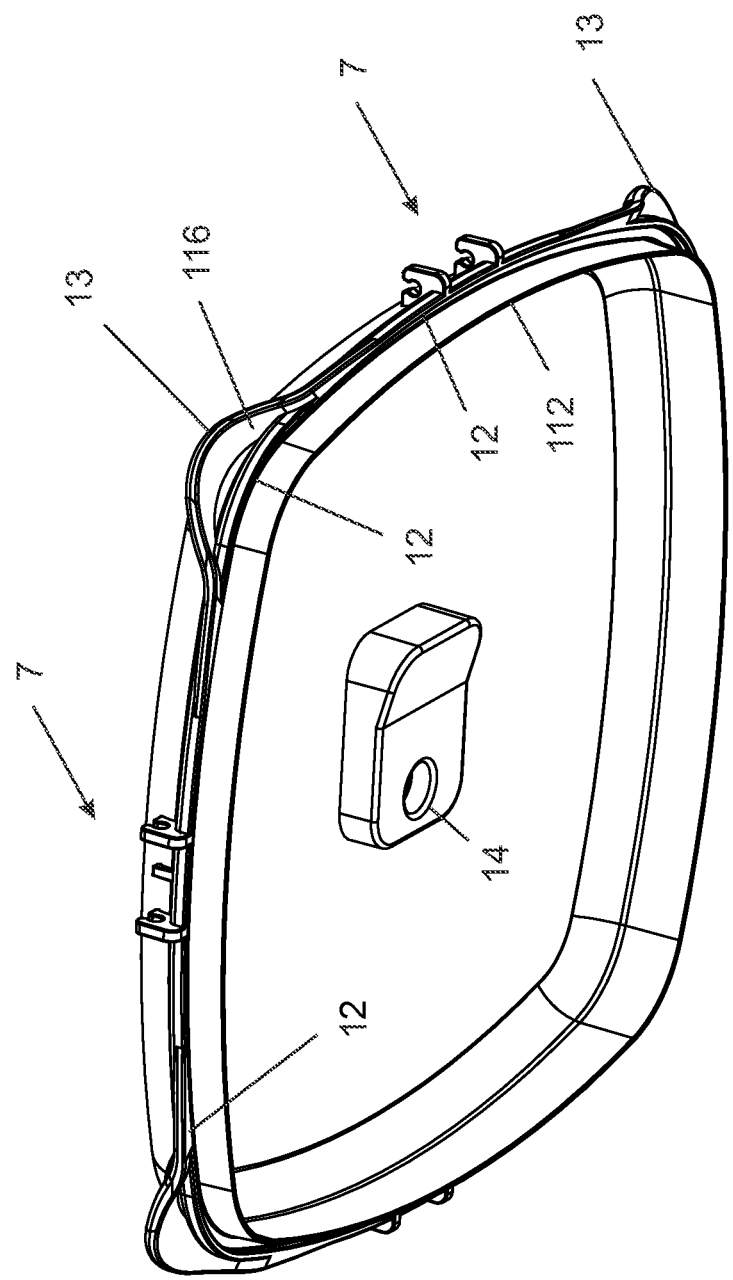
FIG. 11 shows the lid body from below.
Figure 12:
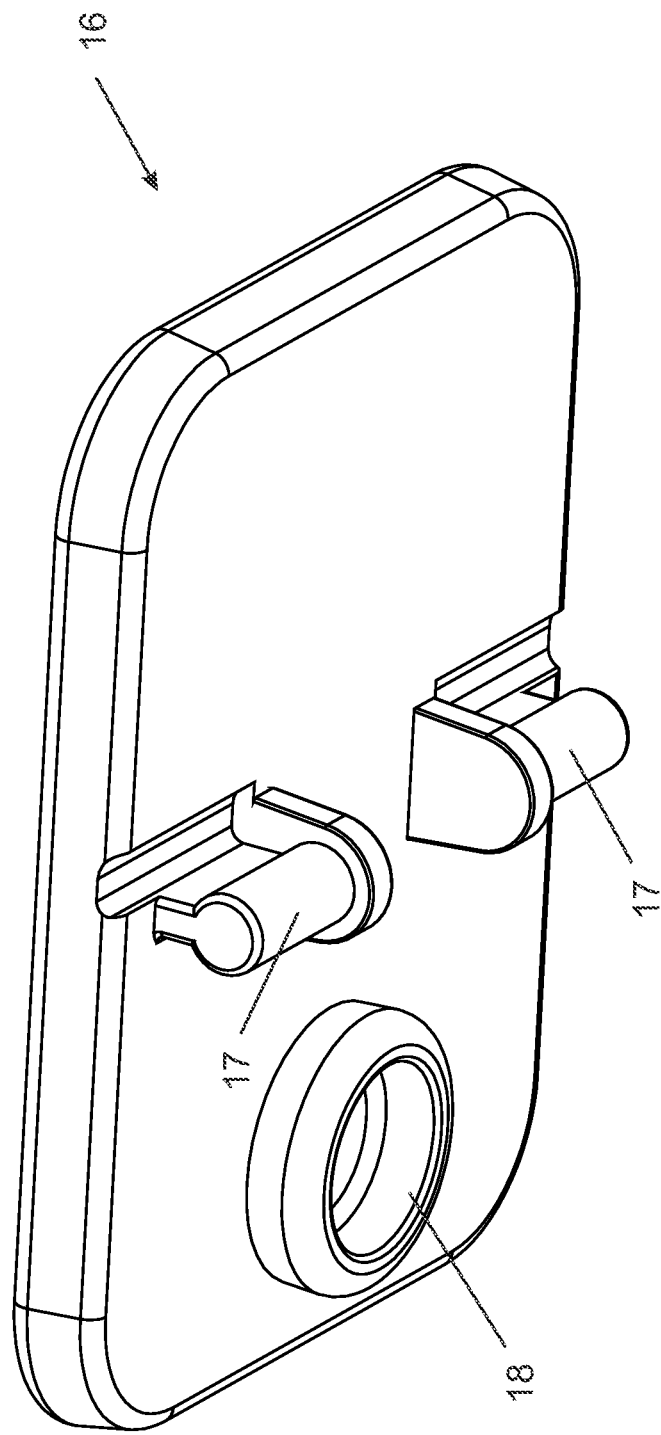
FIG. 12 shows the toggle or rocker from below.

This preferably has features 7 substantially as disclosed in our New Zealand patent 537287 into which our latching clips 8 (eg. as in New Zealand registered design 405603) can be hingedly connected. They operate upwardly and downwardly to the latched condition as shown in FIG. 11 where there is a portion 9 of the latch 8 underlying an outstand profile 10 of the container base 21.

A feature of the lid is the fact that an elastomeric seal 11 is preferably carried by the lid. The seal 11 can be fully pressed down by a surface of the moulded lid. In this respect see FIG. 11 which shows the lid moulding from below in perspective to reveal that surface 12.

Figure 3:
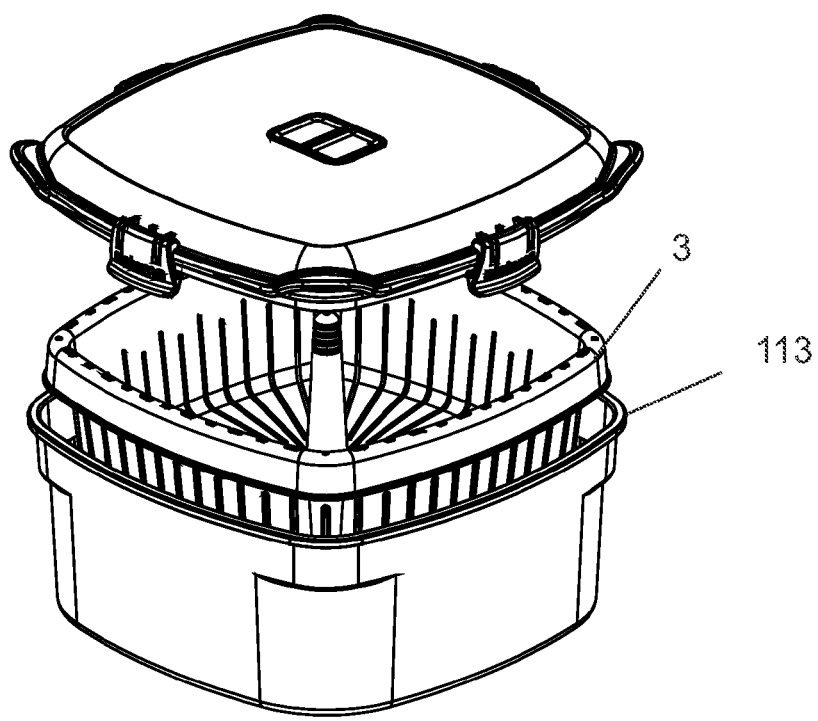
FIG. 3 is a partly exploded arrangement as shown in FIG. 1.

The seal defines a closure plane between the lid 22 and the container base 21. The seal may seat on an upwardly presented sealing surface 113 of the container base 21 as shown in FIG. 3. This surface is coincident with the closure plane of the lid and container base when the lidded container is in the closed condition.

The seal may sit peripherally of a lip 112 of the lid that projects in a direction perpendicular to the closure plane. The lip will assist in the registration of the lid with the base because the lip may snugly slide into the mouth opening 114 of the container base 21.

A feature of the main lid member 6 is at least one outwardly and upwardly handle or flare 13. Preferably there is such provided at each corner like region of the lid to allow each diametrically opposed pair of flares to be used for uplifting the whole lid assembly when unlatched, or for uplifting the whole latched assembly as shown in FIG. 1 or indeed even FIG. 2.

The flares 13 are able to be grasped by a finger of fingers of a person. Preferably the flares 13 have a downwardly facing surface 116 that can be engaged by the finger or fingers of a person. The downwardly presented surface is preferably curved. It is preferably a ruled surface or may be part spherical. The upper most part of the surface 116 may be the midpoint of the flare. The upper most part is set at a height above the closure plane. At this location of the surface 116 of the flare, a person's finger can engage to apply an upward force to the lid to deseat it from the container base 21. This allows the finger or fingers a person to sit above the closure plane at which venting of fluid from the enclosure of the lidded container may occur. Such fluid may be hot steam that could be harmful to a person's fingers. The venting of fluid occurs in a direction that will not result in a direct impinging of steam onto the persons fingers. Ie it is out of the path of steam jettison though some steam may naturally rise above such a path. It is also above those surfaces of edges of the interior of the lid (such as the lower and outer most rim of the interior part of the lid) at where hot condensate may drip from to ensure fingers do not get hurt.

The downwardly facing surface 116 of the flare is a ruled curved surface preferably of a concave shape.

The downwardly facing surface 116 is a partial cylindrical surface. Preferably the orientation being such that the notional cylinder axis extends parallel to the plane of the opening and preferably radially outwardly. This allows a person's finger to be placed there under the finger remaining substantially above the plane of the opening. The cylindrical axis may alternatively be upwardly and outwardly inclined relative the opening plane and away from the lid.

There are preferably two flares located at the periphery of the lid. Their location is preferably at opposed positions on the periphery. This allows a finger or fingers of each hand to grasp the lid at such opposed locations and simultaneously lift the lid thereat.

The lid is of a shape and configuration and of a material and/or material thickness to ensure that the lid is sufficiently rigid. The lid being of a sufficiently rigid configuration and with the provision of at least two flares allows a deseating of the lid from the container base to occur in a manner to avoid a pealing deseating. This assist in a more rapid venting of fluids and in a more evenly distributed manner through the gap created between the lid and the container base. Rather than steam being released only at the gap created at one portion of the container where the lid is being lifted by a person, less steam may be released at regions where the person is holding or lifting the lid when opening the enclosure of the lidded container A lower concentration of steam being released at where a person's finger is touching the lid will mean a more rapid cooling of the steam by ambient conditions and/or less volume of steam and/or shorter duration of any steam exposure thereat in general and will cause more comfort for such person in removing the lid.

Figure 13:
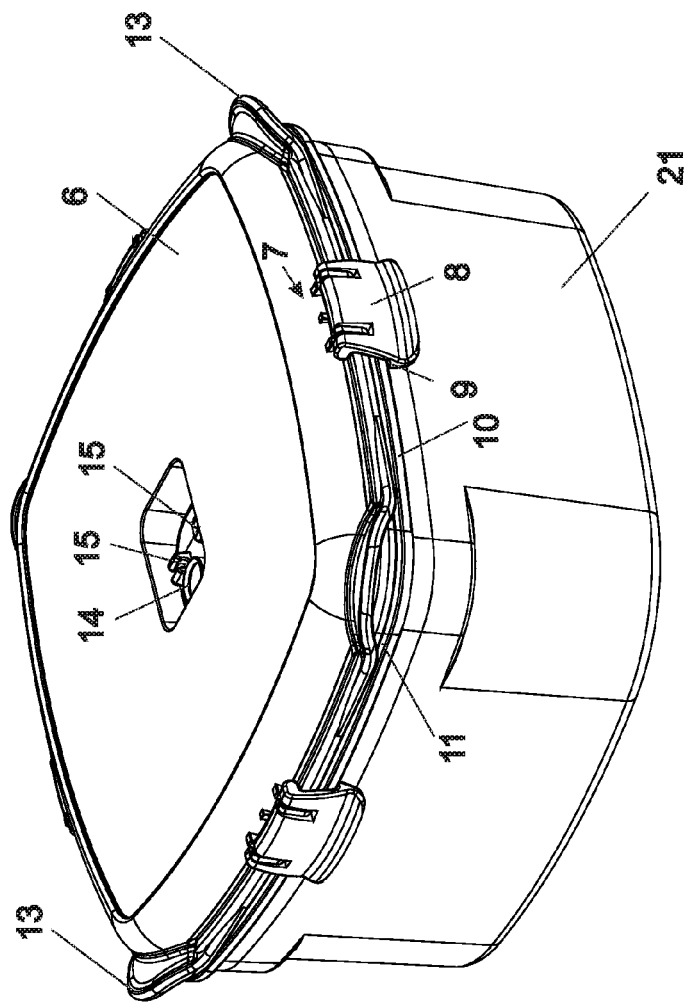
FIG. 13 shows an assembly substantially as in FIG. 1 but with the toggle of the vent control removed so as to show the hinging formations.
Figure 14:
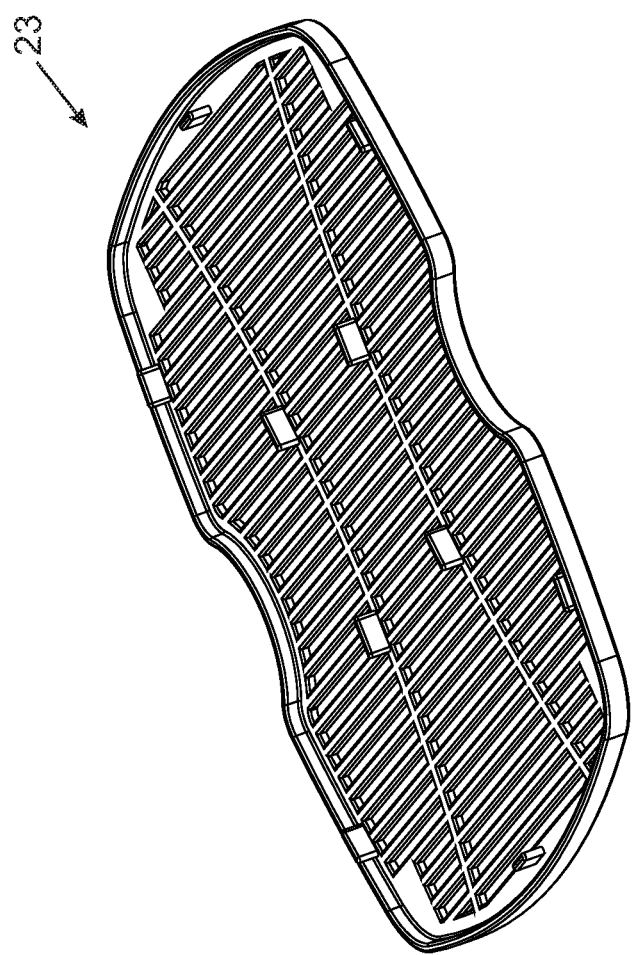
FIG. 14 shows the pedestal tray from below.
Figure 15:
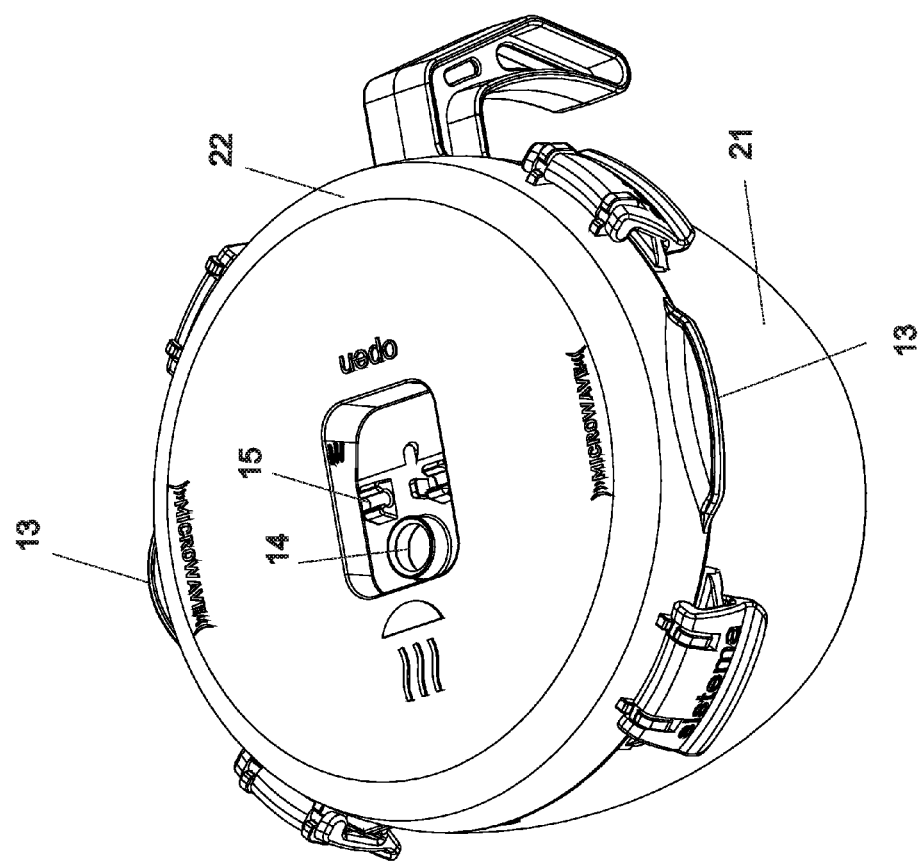
FIG. 15 is a perspective view of an alternative configuration of a lidded container of the present invention wherein the toggle is not shown.
Figure 16:
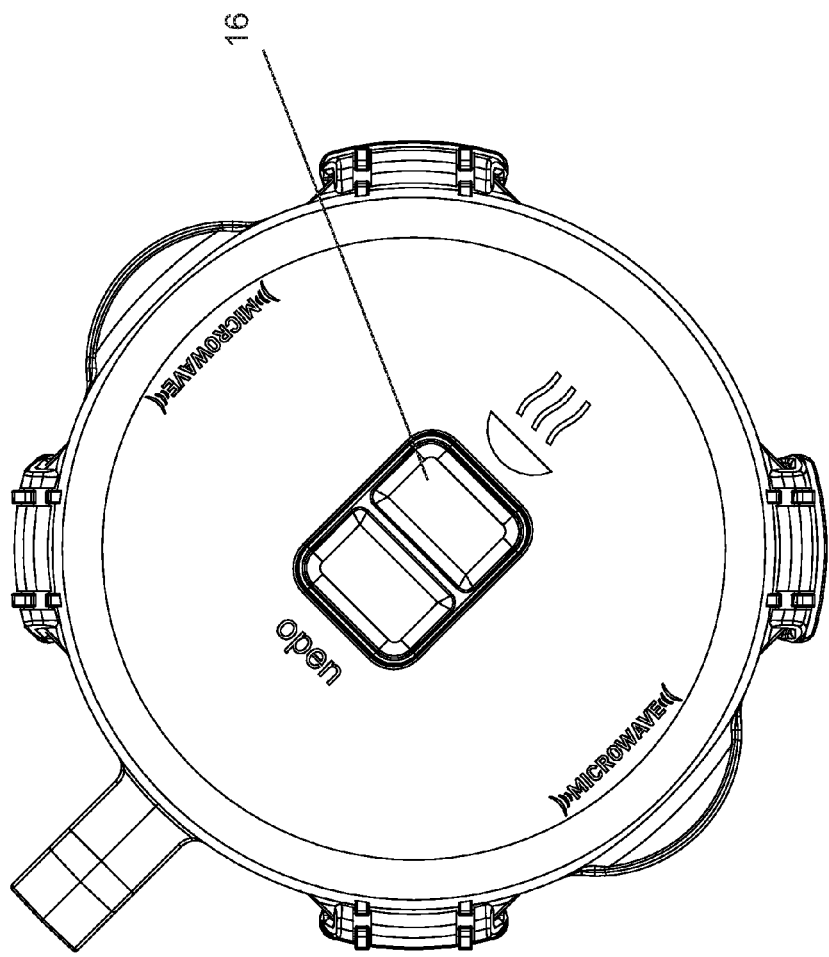
FIG. 16 is a plan view of the container of FIG. 15 (with the toggle)
Figure 17:
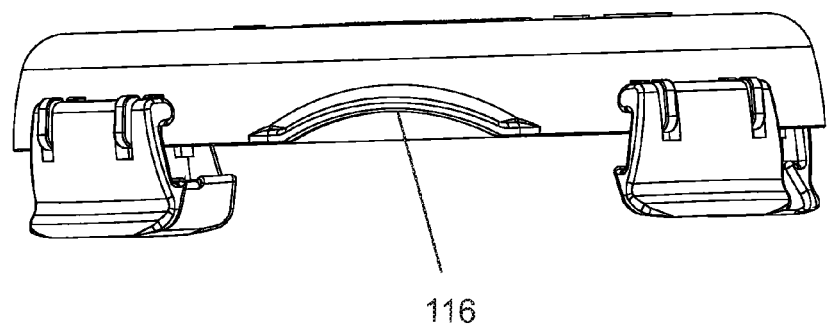
FIG. 17 is a side view of the lid of the container of FIG. 15.
Figure 19:
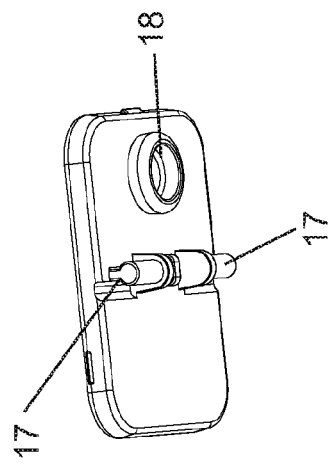
Figure 20:
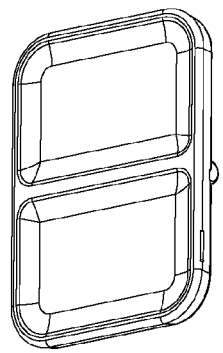
FIG. 20 is a top perspective view of the toggle.

FIGS. 11 and 13 shows a passageway 14 closable under the action of the toggle 16 to have its regions 17 hingedly received by the hinge mounts 15. The region 18 closes the passageway 14 from above.

The provision of the toggle can allow for an initial opening to the enclosure to be formed to release fluids and/or allow pressure equalisation between the enclosure and ambient conditions, before the lid is removed. This will also assist in reducing the discharge of volume and/or localisation of fluid flow through the gap between the lid and container base upon deseating of the lid.

Figure 4:
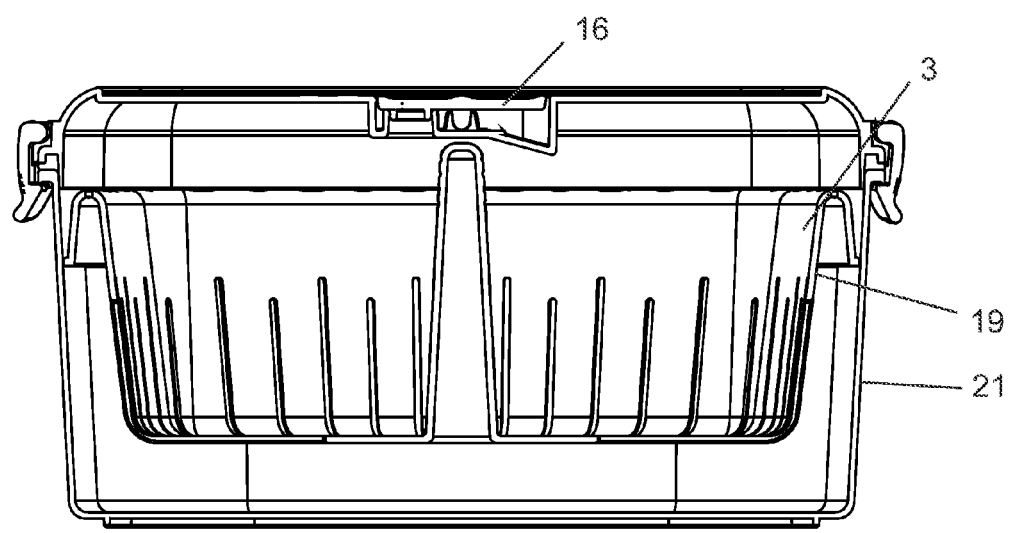
FIG. 4 is a side sectional view of the assembly of FIGS. 1 and 3, but not in an exploded form, the toggle or rocker controlled vent being shown closed.

Shown in FIG. 4 is the downturned flange 121 of the basket 3 in close proximity to the inner surface of the base 21. But as can be determined by reference to the drawings as a whole, the ledge 2, in each instance, will support under the corner region 4.

The upstand 170 preferably has a grip of a region that will stand proud of the base.

The basket 3 has peripheral walls 19 defining a well about the upstand 170. There is a transition zone 20 over the downturned flanges 121 with the corner regions 4. The transition zone 20 has perforations 123 and the well (both walls 19 and the base) has perforations 122. These allow steam to rise upwardly to pass directly into the food to be steamed as well as to pass back down from the lid assembly.

Figure 2:
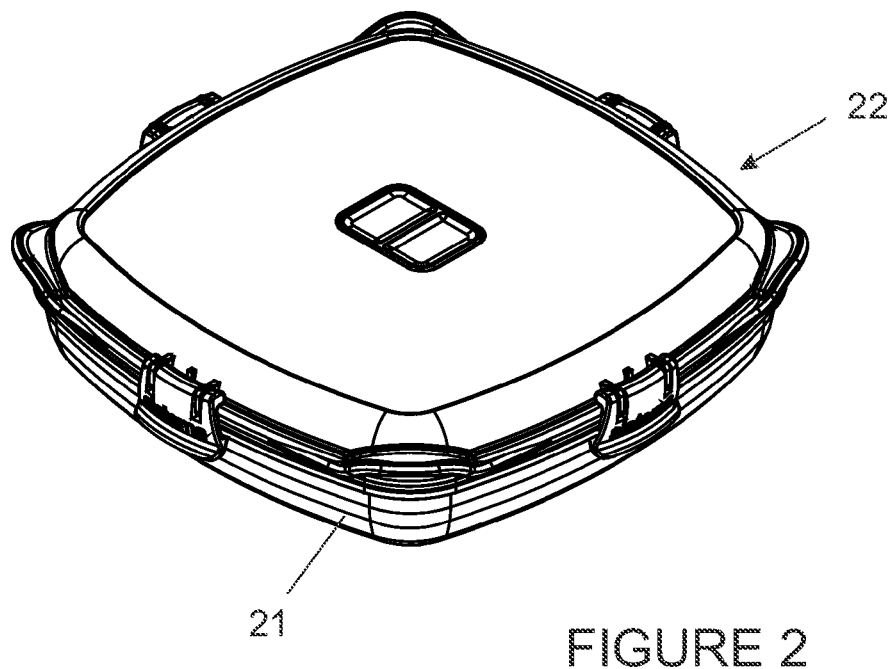
FIG. 2 is a similar view to that of FIG. 1 but of a shallower based lidded container suitable for having a pedestal supported tray included therein.
Figure 5:
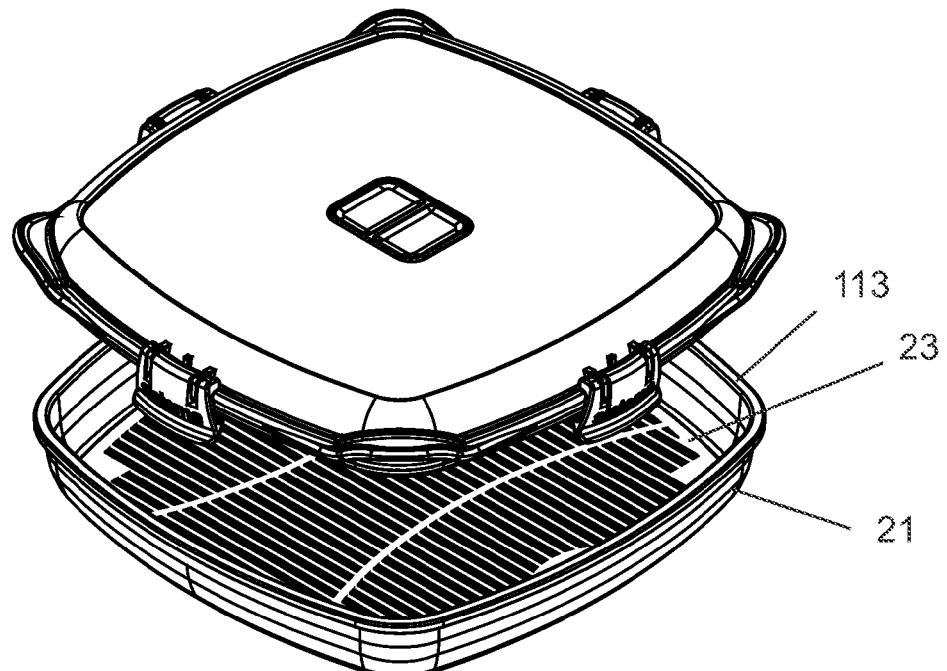
FIG. 5 is a partly exploded view of the arrangement of FIG. 2 showing a pedestal based perforate tray supported over the bottom of the base, the toggle or rocker vent of the lid still being shown closed.
Figure 6:
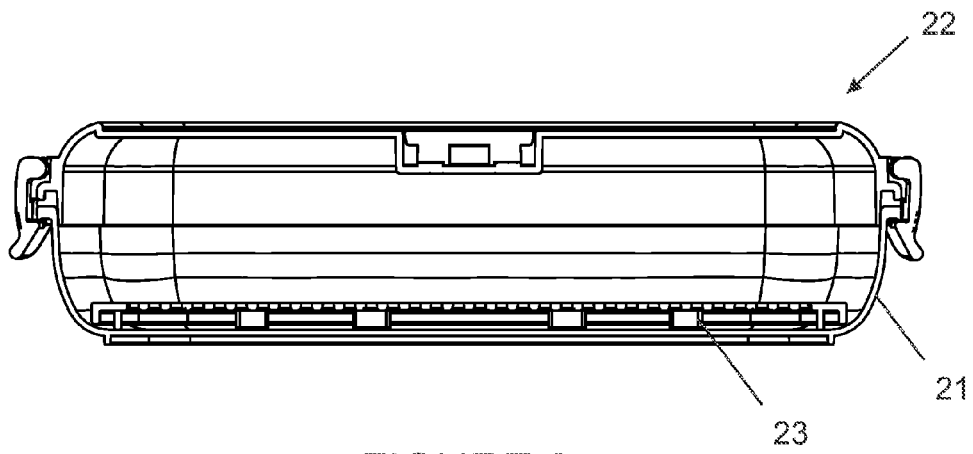
FIG. 6 is a side sectional view of the unexploded lidded container of FIGS. 2 and 5.

FIG. 6 shows a pedestal tray 23 on the base of the embodiment of FIG. 2.

FIGS. 15 to 21 show a variation of a lidded container of the present invention wherein the plan of the container is substantially circular.

Figure 18A:
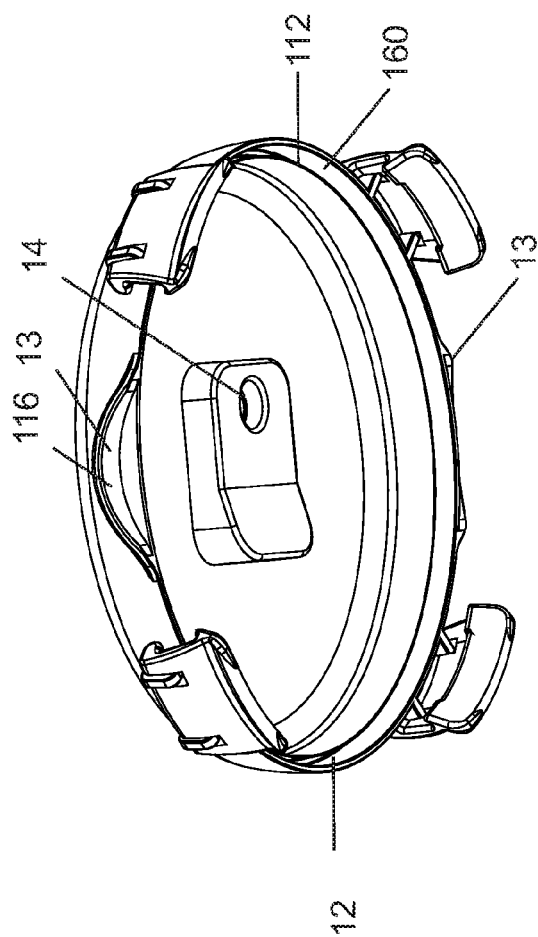
FIG. 18a is a bottom perspective view of the lid of the container of FIG. 15.
Figure 18B:
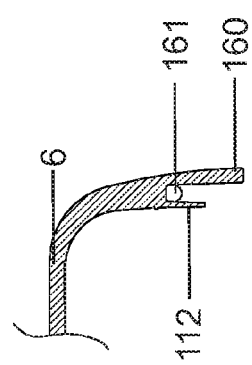
FIG. 18b shows a part cross-section of the perimeter of the lid of FIG. 18a, FIG. 19 is a bottom perspective view of the toggle.
Figure 21:
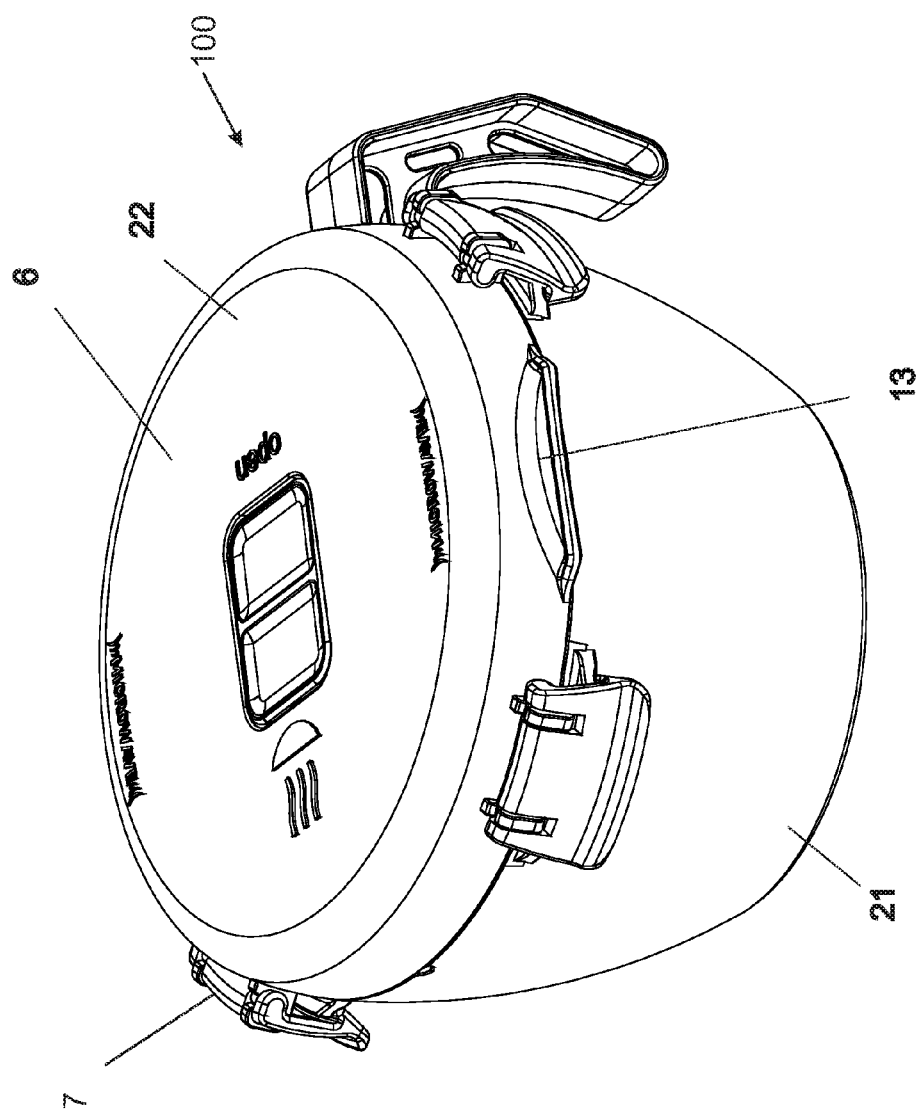
FIG. 21 is a perspective view of the preferred form of the container also shown in part in FIG. 15.

In FIGS. 18a and 18b there is shown a variation of the perimeter of the lid wherein peripheral to the seal 161 carried by the lid, there is a perimeter lip 160 that projects downwards from the closure plane at the seal. The perimeter lip 160 may locate about a complementary perimeter region of the container base when the lid and container base are engaged together. Upon deseating of the seal, the perimeter lip 160 will deflect the release of steam passing over the seal in a downward direction at it exits the enclosure. This will also assist in providing more comfort to a person holding the lid.

All the moulded components used in the assembly are suitable and safe for microwave useage.

The invention claimed is:

1. A lid, or lid body of a lid assembly, having a peripheral profile at or near its periphery, said peripheral profile adapted to seal directly, or indirectly via an interposed seal, onto an underlying compatible container, wherein points of contact between a downwardly facing edge of the peripheral profile and an upwardly facing edge of the underlying container, when the lid is sealed onto the container, define a notional closure plane;

wherein at opposed edges of the lid when viewed in plan view, the lid or lid body has been moulded with an outstand, said outstand formed as a smooth continuation of an outermost peripheral portion of the lid, wherein said outstand flares upwardly and outwardly of the peripheral profile such that at least a portion of a downwardly facing surface of the outermost edge of the outstand is above the notional closure plane and concave, said outstand being adapted to allow finger engagement therewith such that a finger, when engaged with said downwardly facing surface of the outstand, engages at a position above the notional closure plane during and to assist uplifting of the lid or lid body.

2. The lid, or lid body of a lid assembly as claimed in claim 1 wherein said lid or lid body is quadrilateral in plan shape and wherein the outstands are positioned at corners of the lid or lid body.

3. The lid or lid body of a lid assembly as claimed in claim 1 wherein each outstand defines a downwardly facing lifting surface which is non planar.

4. The lid or lid body of a lid assembly as claimed in claim 1 wherein the lid or lid body carries an underlying elastomeric seal able to be held by a seal matching downwardly facing shoulder, plateau or other continuous profile to the underlying compatible container, said container being a complementary underlying walled open topped container.

5. The lid or lid body of a lid assembly as claimed in claim 1 which carries latches at opposed edges of the lid or lid body, said latches configured and adapted to engage with the container to secure the lid or lid body to the container.

6. The lid or lid body of a lid assembly as claimed in claim 1 which has a closable vent.

7. The lid or lid body of a lid assembly as claimed in claim 1 wherein the peripheral profile or, if present, the interposed seal seat with the container at the notional closure plane, and wherein the lid body is adapted and configured to allow the deseating of the lid from the container without substantial out of plane deformation of the peripheral profile.

8. The lid or lid body of a lid assembly as claimed in claim 1 wherein a lip of the lid extends about the peripheral profile and projects a distance below the peripheral profile and interposed seal, if present, to prevent any flow of fluid from the enclosure of the lidded container during deseating being directed purely outwardly in a direction substantially parallel to the notional plane of the peripheral profile.

9. A lidded container suitable for use in an operational microwave oven comprising
- a container base having peripheral walls and an open top,
- a lid able to seat and thereby close the container base at the open top to define an enclosure;
- wherein the lid has a body adapted to carry a near peripheral seal to be interposed between a downward facing shoulder or plateau of the lid onto the top of a peripheral wall of the base container,
- wherein points of contact between a downwardly facing edge of the seal and an upwardly facing edge of the peripheral wall of the base container, when the lid is sealed onto the container, define a notional closure plane,
- wherein the lid has outstands moulded as a smooth continuation of an outermost peripheral portion of the lid at opposed perimeter regions of the lid to act as handle pairs for lifting the lid relative to the container base to deseat the lid therefrom, said outstands being of a shape that flares upwardly and outwardly of the peripheral seal such that at least a portion of a downwardly facing surface of the outermost free edge of the outstand is above the notional closure plane and concave, said outstands being adapted to allow finger engagement therewith such that a finger, when engaged with said downwardly facing surface of the outstand, engages at a position above the notional closure plane during lifting of the lid.

10. The lidded container as claimed in claim 9 wherein said lid and said container are quadrilateral in plan shape and wherein the outstands are positioned at corners of the lid.

11. The lidded container as claimed in claim 9 wherein each outstand defines a downwardly facing lifting surface which is non planar.

12. The lidded container as claimed in claim 9 wherein the outstands are handles integrally moulded with said body.

13. The lidded container as claimed in claim 12 wherein the lid has a closable vent.

14. The lidded container as claimed in claim 12 wherein said container base is of a substantially quadrilateral footprint and has a peripheral wall with at least one of:
i) outwardly bulging wall regions and
ii) convexly curved transitions between wall regions.

15. The lidded container as claimed in claim 9 wherein the lid carries an underlying elastomeric seal able to be held by a seal matching downwardly facing shoulder, plateau or other continuous profile to the underlying compatible container, said container being a complementary underlying walled open topped container.

16. The lidded container as claimed in claim 9 wherein the lid carries latches at opposed edges, said latches configured and adapted to engage with the container to secure the lid or lid body to the container.

17. The lidded container as claimed in claim 9 wherein the peripheral seal and the container base seat with each other at the notional closure plane and the lid body is adapted and configured to allow deseating to occur without substantial out of plane deformation of the peripheral seal.

18. The lidded container as claimed in claim 9 wherein the lid body and the container base are adapted and configured to allow, during the deseating of the seal, a complete peripheral gap to be created between said lid and container base, substantially simultaneously, in order to rapidly equalize pressure within the lidded container with ambient conditions.

19. The lidded container as claimed in claim 9 wherein the lid body and the container base are adapted and configured to allow, during the deseating of the seal, a complete peripheral gap to be created between said lid and container base in order to equalize pressure within the lidded container with ambient conditions in a manner evenly distributed at the complete peripheral gap.

20. The lidded container as claimed in claim 9 wherein a lip of the lid extends about the peripheral seal and projects a distance below the peripheral seal to prevent any flow of fluid from the enclosure of the lidded container during deseating being directed purely outwardly in a direction substantially parallel to the notional plane of the peripheral seal.

* * * * *